United States Patent
Bauer et al.

(10) Patent No.: US 12,281,448 B2
(45) Date of Patent: Apr. 22, 2025

(54) WELDING UNIT FOR WELDING RAILS OF A TRACK

(71) Applicant: PLASSER & THEURER EXPORT VON BAHNBAUMASCHINEN GESELLSCHAFT M.B.H., Vienna (AT)

(72) Inventors: Andreas Bauer, Alberndorf (AT); Markus Oellinger, Wang (AT); Ronald Steiner, Rabenstein an der Pielach (AT)

(73) Assignee: Plasser & Theurer Export von Bahnbaumaschinen Gesellschaft M.B.H., Vienna (AT)

( * ) Notice: Subject to any disclaimer, the term of this patent is extended or adjusted under 35 U.S.C. 154(b) by 612 days.

(21) Appl. No.: 17/631,567

(22) PCT Filed: Jun. 30, 2020

(86) PCT No.: PCT/EP2020/068321
§ 371 (c)(1),
(2) Date: Jan. 31, 2022

(87) PCT Pub. No.: WO2021/018497
PCT Pub. Date: Feb. 4, 2021

(65) Prior Publication Data
US 2022/0316146 A1 Oct. 6, 2022

(30) Foreign Application Priority Data
Jul. 31, 2019 (AT) .................. A 265/2019

(51) Int. Cl.
*B23K 37/00* (2006.01)
*B23K 37/02* (2006.01)
(Continued)

(52) U.S. Cl.
CPC .......... *E01B 29/46* (2013.01); *B23K 37/0217* (2013.01); *B23K 37/0282* (2013.01); *E01B 11/46* (2013.01); *B23K 2101/26* (2018.08)

(58) Field of Classification Search
CPC ..... E01B 29/46; E01B 11/46; B23K 37/0217; B23K 37/0282; B23K 2101/26; B23K 11/046; B23K 37/02–047; B23K 37/08
(Continued)

(56) References Cited

U.S. PATENT DOCUMENTS 4,175,897 A 11/1979 Kuchuk-Yatsenko et al.
5,099,097 A * 3/1992 Theurer .................. E01B 29/46
219/97
(Continued)

FOREIGN PATENT DOCUMENTS

AT 006690 U2 2/2004
AT 507243 A1 3/2010
(Continued)

*Primary Examiner* — Kiley S Stoner
(74) *Attorney, Agent, or Firm* — Laurence A. Greenberg; Werner H. Stemer; Ralph E. Locher

(57) ABSTRACT

A welding unit for welding rails of a track includes a first sub-unit which is displaceable on unit guides in a rail longitudinal direction relative to a second sub-unit by using displacement cylinders. Each sub-unit includes clamping cylinders disposed underneath the unit guides and coupled to clamping jaws for clamping the rails. The two sub-units are connected by the displacement cylinders in that a cylinder body of the respective displacement cylinder is connected to one sub-unit and a piston rod of the respective displacement cylinder is connected to the other sub-unit. Thus, it is not necessary to support the displacement cylinders relative to a transverse beam disposed at the front.

11 Claims, 2 Drawing Sheets

(51) Int. Cl.
*E01B 11/46* (2006.01)
*E01B 29/46* (2006.01)
*B23K 101/26* (2006.01)

(58) Field of Classification Search
USPC .................. 228/44.3, 47.1, 49.1–49.2, 49.4
See application file for complete search history.

(56) References Cited

U.S. PATENT DOCUMENTS

| | | | | |
|---|---|---|---|---|
| 6,031,197 | A | * | 2/2000 | Larsson .................. E01B 11/50 |
| | | | | 219/101 |
| 8,735,761 | B2 | | 5/2014 | Theurer et al. |
| 8,979,083 | B2 | | 3/2015 | Theurer et al. |
| 9,168,608 | B2 | * | 10/2015 | Vaia .................. E01B 29/46 |
| 9,662,726 | B2 | * | 5/2017 | Fletzer .................. B23D 79/026 |
| 2008/0230520 | A1 | | 9/2008 | Lichtberger et al. |
| 2011/0168675 | A1 | * | 7/2011 | Theurer .................. E01B 29/46 |
| | | | | 219/53 |
| 2012/0025436 | A1 | * | 2/2012 | Theurer .................. E01B 29/46 |
| | | | | 269/25 |
| 2012/0138577 | A1 | * | 6/2012 | Vaia .................. B23K 11/046 |
| | | | | 219/78.15 |
| 2016/0199925 | A1 | * | 7/2016 | Fletzer .................. E01B 31/12 |
| | | | | 409/300 |
| 2017/0165782 | A1 | * | 6/2017 | Kuchuk-Yatsenko .................. |
| | | | | B23K 11/046 |
| 2017/0292225 | A1 | * | 10/2017 | Muehlleitner ..... B23K 11/0073 |

FOREIGN PATENT DOCUMENTS

| | | | | |
|---|---|---|---|---|
| AT | 507560 | A4 | | 6/2010 |
| AT | 14053 | U1 | | 3/2015 |
| AT | 15368 | U1 | * | 5/2017 ........... B23K 11/046 |
| CH | 703854 | A2 | * | 3/2012 ......... B23K 37/0435 |
| CN | 102395444 | A | | 3/2012 |
| CN | 107825050 | A | * | 3/2018 ......... B23K 37/0435 |
| DE | 2801249 | A1 | | 7/1979 |
| DE | 19735195 | C1 | | 1/1999 |
| GB | 1056812 | A | | 2/1967 |
| GB | 2000829 | A | | 1/1979 |
| WO | 9721514 | A1 | | 6/1997 |
| WO | 2010119461 | A1 | | 10/2010 |
| WO | WO-2017133828 | A1 | * | 8/2017 ............. B23K 31/02 |
| WO | WO-2020058208 | A1 | * | 3/2020 ........... B23K 13/015 |

\* cited by examiner

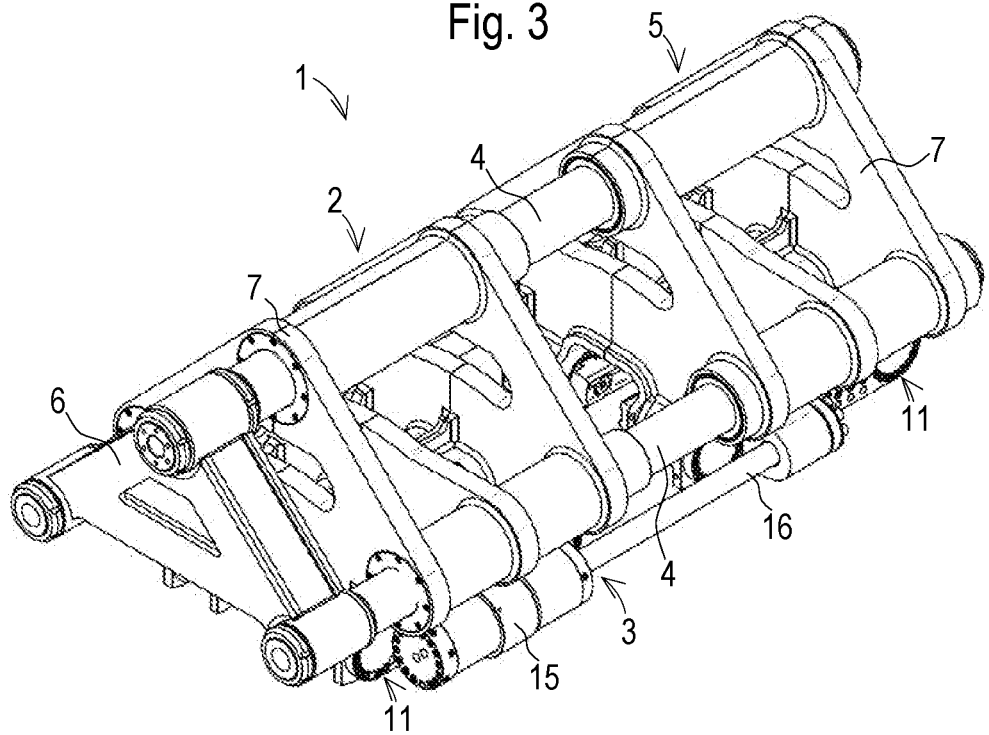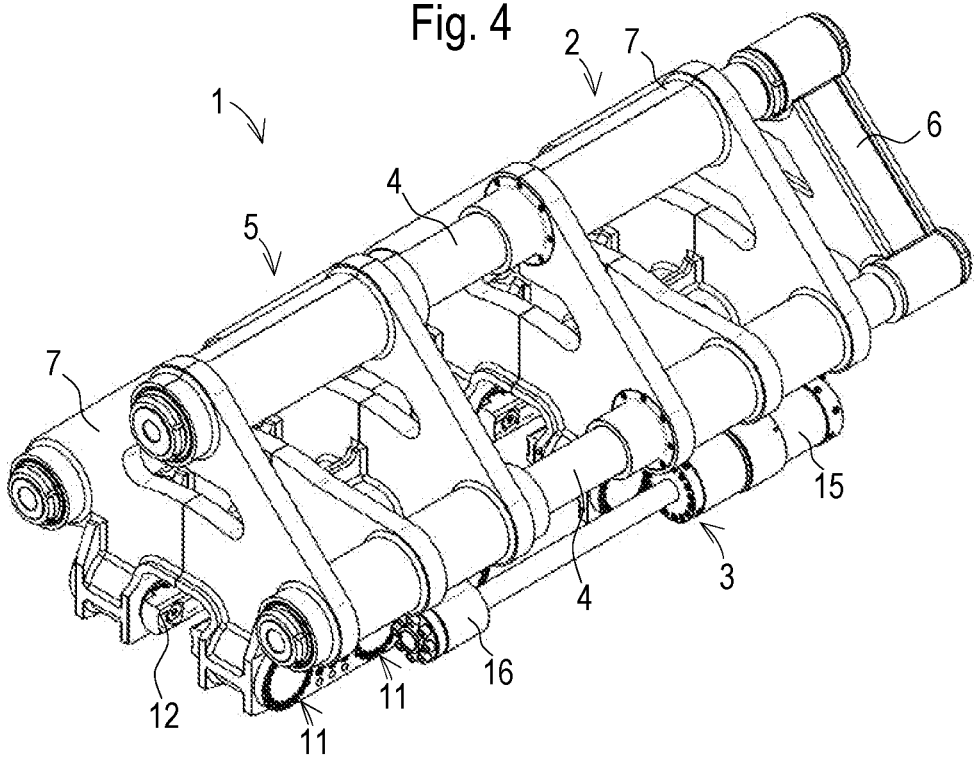

WELDING UNIT FOR WELDING RAILS OF A TRACK

FIELD AND BACKGROUND OF THE INVENTION

The invention relates to a welding unit for welding rails of a track, including a first sub-unit which is displaceable on unit guides in a rail longitudinal direction relative to a second sub-unit by means of displacement cylinders, wherein each sub-unit comprises clamping cylinders that are arranged underneath the unit guides and coupled to clamping jaws for clamping the rails.

PRIOR ART

Known welding units for welding rails comprise two sub-units, wherein one sub-unit is displaceable on unit guides relative to the other sub-unit in a rail longitudinal direction by means of displacement cylinders. The respective sub-unit has a clamping device for tightly clamping a rail end of the rails to be welded. During the welding process, the sub-units and the rail ends clamped therein are moved towards one another. Welding units of the specified type are also employed for closure welds below a normal temperature. During this, high pulling forces have to be applied to the rail ends. The demands on the unit guides, the displacement cylinders and the clamping devices are correspondingly high.

AT 006 690 U2, DE 28 01 249 A1 and WO 2010/119461 A1 disclose designs having tong-like sub-units. In this, each sub-unit has two tong levers that are pivotable about a rotation axis oriented in the longitudinal direction of the rails. Clamping jaws for clamping the rail ends are arranged on lower lever arms. Upper lever arms are coupled to a clamping cylinder. By actuation of the clamping cylinder, the clamping jaws clamp the respective rail end via the lever mechanism. The displacement cylinders are arranged at either side of the rails to be welded. In this, the displacement cylinders additionally serve as unit guides by means of a guide column arranged in the rotation axis. The tong-like design of the sub-units requires that the clamping cylinders are arranged above the unit guides, and that clamping forces stress the mountings of the sub-units on the guide column.

Another design is known according to AT 507 243 A1 and AT 507 560 A4. Here, three guide columns are arranged as unit guides, wherein at least two unit guides are connected by way of a transverse beam arranged at the front. A sub-unit comprises in each case a rigid basic body which has a free space at its underside for a rail end to be clamped. Clamping jaws are coupled directly to clamping cylinders arranged underneath the unit guides. Thus, an actuation of the clamping cylinders immediately causes a clamping force, wherein the basic body absorbs the counterforces. A displacement of the one sub-unit relative to the other sub-unit takes place via pull rods and displacement cylinders which are braced against the transverse beam.

SUMMARY OF THE INVENTION

It is the object of the invention to indicate a welding unit of the type mentioned at the beginning which has an improved structure.

According to the invention, this object is achieved by way of the features described below. Dependent claims indicate advantageous embodiments of the invention.

In this, the two sub-units are connected by means of the displacement cylinders in that a cylinder body of the respective displacement cylinder is connected to the one sub-unit and a piston rod of the respective displacement cylinder is connected to the other sub-unit. Thus, it is not necessary to support the displacement cylinders relative to a front-side transverse beam. In this manner, the displacement cylinders together with the clamping cylinders form a unit for transmission of longitudinal forces into the rail ends to be welded. Essential in this is the functional uncoupling of the unit guides from the force transmission. The unit guides assume the guiding function of the two sub-units relative to one another without contributing to the clamping function of the clamping cylinders. The unit guides remain free of pulling- or pressing forces.

In an advantageous further development, longitudinal axes of the displacement cylinders and longitudinal axes of the clamping cylinders are arranged approximately in a common plane. This minimizes the stresses in the sub-units since no additional bending stresses occur as a result of force axes being spaced from one another.

In this, it is advantageous if the clamping jaws are arranged in such a way that the rails to be welded can be clamped with a neutral axis lying in the common plane. In this manner, the displacement forces act in one plane with the neutral axis of the rails, so that the sub-units and the unit guides do not have to absorb any tilting moments. Only weight forces of the sub-units and the rail ends clamped and raised during a welding procedure act on the unit guides.

A further development of the invention envisages that, underneath the unit guides, each sub-unit has a clamping body into which several clamping cylinders are integrated side by side. Thus, a compact structural design of the respective sub-unit is achieved, wherein a resulting total clamping force of sufficient magnitude is available.

A compact design of the entire welding unit is favoured if the displacement cylinders are flange-mounted to lateral outer surfaces of the sub-units. In this way, the arrangement of the displacement cylinders is structurally uncoupled from the sub-units and the clamping cylinders. This facilitates the layout of the welding unit, wherein the displacement forces that can be achieved can be varied by arranging different displacement cylinders. The result is a modular system in which structurally identical sub-units can be used for welding units with different performance.

When designing the guides, it is advantageous if, as a guiding system, three unit guides designed in particular as sliding tubes are arranged offset to one another. With this, an optimum balance between weight and stability of the guiding system can be achieved.

Advantageously, two outer unit guides are arranged side by side, and a central unit guide is arranged upwardly offset. In this, the forces to be absorbed are distributed to the three unit guides in largely equal measure.

The stability of the guiding system is further increased if the first sub-unit is arranged between the second sub-unit and a transverse connecting part, and if the unit guides are rigidly connected, on the one hand, to the second sub-unit and, on the other hand, to the transverse connecting part. In this, the transverse connecting part is merely a component of the guiding system and does not transmit any displacing- or clamping forces.

A further improvement of the structure envisages that each sub-unit has a structurally identical basic body. This advantageous embodiment is achieved by decoupling the guiding system and the displacement cylinders.

In this, it is advantageous if the respective basic body has several connecting points side by side at both longitudinal sides for flange-mounting displacement cylinders of different length. In this way, the mounting of the displacement cylinders can be varied in a simple manner. During this, welding units of different performance can be realized by exchanging the displacement cylinders.

BRIEF DESCRIPTION OF THE FIGURES

The invention will be described below by way of example with reference to the accompanying drawings. There is shown in a schematic manner in.

DETAILED DESCRIPTION OF THE INVENTION

Figure 1:
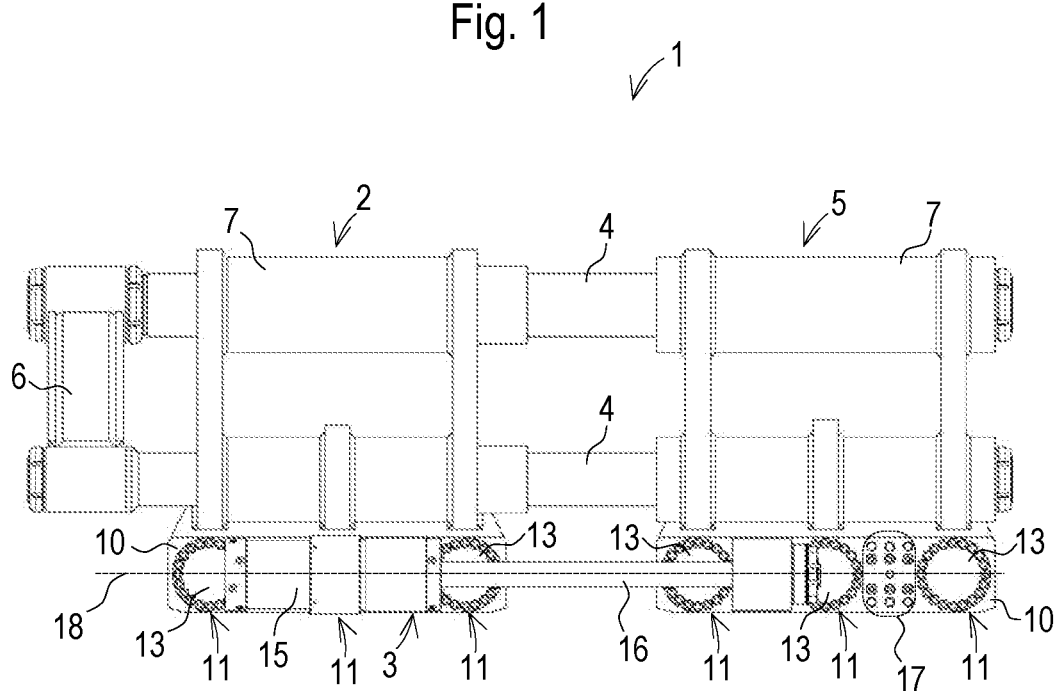
FIG. 1 a welding unit in a side view
FIG. 2 a welding unit in a front view
FIG. 3 a welding unit in a first oblique view
FIG. 4 a welding unit in a second oblique view
Figure 2:
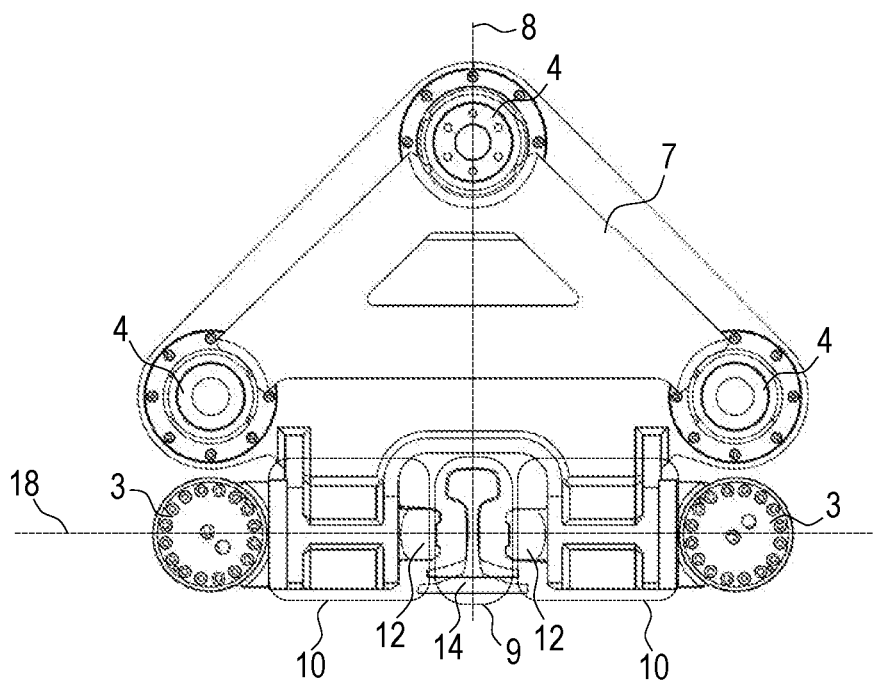

In the welding unit 1 depicted in FIGS. 1 to 4, a first sub-unit 2 is displaceable relative to a second sub-unit 5 along unit guides 4 by means of displacement cylinders 3. The unit guides 4, arranged at the corner points of an isosceles triangle in cross-section, are rigidly connected at the ends to a transverse connecting part 6. At the opposite side to the transverse connecting part 6, the unit guides 4 are rigidly connected to the second sub-unit 5. The displaceable first sub-unit 2 is arranged there between. In this way, the unit guides 4 and the connections at the ends form a rigid guide system.

Each sub-unit 2, 5 comprises a structurally identical basic body 7 that is designed, for example, as a welded structure. In the embodiment shown, the unit guides 4 comprise three sliding tubes. Two lower sliding tubes are arranged symmetrically with respect to a vertical symmetry surface 8. An upper sliding tube is arranged centrally above the former, so that the longitudinal axis of the sliding tube lies in the symmetry surface 8. Arranged in the basic body 7 of the first sub-unit 2 are slide bushings which slide on the sliding tubes. The sliding tubes are clamped tightly in the basic body 7 of the second sub-unit 5.

Below the unit guides 4 at both sides of a free space 9, each sub-unit 2, 5 has a respective clamping body 10. Arranged side by side in the clamping body 10 in each case are three inner cylinders in which pistons having piston rods are guided. In this manner, each clamping body 10 comprises three hydraulically coupled clamping cylinders 11, the piston rods of which are connected at the ends to a common clamping jaw 12. At the outer surfaces of the respective clamping body 10, the clamping cylinders 11 are closed off by means of cylinder covers 13.

In the free space 9 between the clamping bodies 10, rails 14 to be welded are received and clamped tightly. Specifically, a hydraulic actuation of the clamping cylinders 11 takes place during operation, as a result of which the clamping jaws 12 are pressed to the rails 14 to be welded to one another.

The displacement cylinders 3 are flange-connected at both sides to lateral outside surfaces of the sub-units 2, 5. In this, a cylinder body 15 of the respective displacement cylinder 3 is connected to the one sub-unit 2, and a piston rod 16 is connected to the other sub-unit 5. Favourably, connecting points 17 for the displacement cylinders 3 are arranged in the area between two clamping cylinders 11 of the respective clamping body 10. In this way, longitudinal axes of the displacement cylinders 3 and longitudinal axes of the clamping cylinders 11 are arranged approximately in a common plane 18. The object is the avoidance of bending moments caused by vertically spaced force axes.

For the purpose of using displacement cylinders 3 of different lengths, it is expedient if each clamping body 10 has two connecting points 17 between the three clamping cylinders 11. Then, in order to muster greater displacement forces, longer displacement cylinders 3 having several pressure chambers can be flange-connected to the connecting points 17 that are distanced furthest from one another.

As a result of the structural separation of the clamping cylinder arrangement and the guide system, no pulling forces are introduced into the guide system during a welding operation. Only the weight force of the welding unit and of the rails 14 to be welded as well as rail tension forces in vertical direction are acting on the guide system.

A shearing device for removing a welding bead is provided between the two sub-units 2, 5. A lifting device for lifting the rails is fastened to each outer front surface of the two sub-units 2, 5.

In preparation of the welding operation, both rails 14 are lifted from the sleepers laying thereunder by means of the lifting devices and are pressed against stop elements. Subsequently, the clamping cylinders 11 are actuated in order to press the clamping jaws to a rail web of the respective rail 14 with a high clamping force (1600 kN, for example). The clamping jaws 12 are connected to a secondary electric circuit of the welding unit 1 and cause a transmission of current to the rails 14. Alternatively, separate electric electrodes may also be pressed to the rails 14.

To initiate a welding procedure, the sub-units 2, 5 together with the gripped rails 14 are moved towards one another with a pulling force by actuation of the displacement drives 3. In this, up to 1500 kN are achieved in the course of a so-called closure welding. As soon as the spacing of the two rail ends as required for the welding has been achieved, the supply of electric current is started.

In case that the ambient temperature is above the neutral temperature, it is also possible during a closure welding to initially move the rails 14 apart from one another—by corresponding actuation of the two displacement drives 3—in order to produce a welding gap.

The invention claimed is:

1. A welding unit for welding rails of a track, the welding unit comprising:
   unit guides extending in a rail longitudinal direction;
   clamping jaws for clamping the rails;
   displacement cylinders each having a respective cylinder body and a respective piston rod;
   first and second sub-units, said first sub-unit being displaceable on said unit guides in said rail longitudinal direction relative to said second sub-unit by said displacement cylinders, each of said sub-units including clamping cylinders disposed underneath said unit guides and coupled to said clamping jaws; and
   said cylinder body of each displacement cylinder being directly flange-connected to a respective one of said sub-units and said piston rod of each displacement cylinder being directly flange-connected to a respective other of said sub-units, for interconnecting said first and second sub-units.

2. The welding unit according to claim 1, wherein said displacement cylinders have longitudinal axes, said clamping cylinders have longitudinal axes, and said longitudinal axes of said displacement cylinders and of said clamping cylinders are disposed approximately in a common plane.

3. The welding unit according to claim 2, wherein said clamping jaws are located to permit the rails for welding to be clamped with a neutral axis lying in said common plane.

4. The welding unit according to claim 1, wherein each of said sub-units has a clamping body underneath said unit guides, and a plurality of said clamping cylinders are integrated into said clamping bodies side by side.

5. The welding unit according to claim 1, wherein said sub-units have lateral outer surfaces, and said displacement cylinders are flange-mounted to said lateral outer surfaces.

6. The welding unit according to claim 1, wherein said unit guides include three unit guides disposed offset relative to one another.

7. The welding unit according to claim 6, wherein said unit guides are sliding tubes.

8. The welding unit according to claim 6, wherein said unit guides include two outer unit guides disposed side by side and a central unit guide disposed upwardly offset from said two outer unit guides.

9. The welding unit according to claim 1, which further comprises a transverse connecting part, said first sub-unit being disposed between said second sub-unit and said transverse connecting part, and said unit guides being rigidly connected to said second sub-unit and to said transverse connecting part.

10. The welding unit according to claim 1, wherein each of said sub-units has a respective structurally identical basic body.

11. The welding unit according to claim 10, wherein said displacement cylinders have different lengths, and each of said basic bodies has a plurality of connecting points disposed side by side at two longitudinal sides for flange-mounting said displacement cylinders having different lengths.

* * * * *